United States Patent [19]

den Hollander et al.

[11] 4,404,231

[45] Sep. 13, 1983

[54] PROCESS FOR PRODUCING A FAT-CONTINUOUS EMULSION SPREAD WITH IMPROVED PERCEIVED TASTE SENSATIONS OF WATER SOLUBLE FLAVORANTS

[75] Inventors: Cornelis den Hollander, Rotterdam; Berend J. Arends, Vlaardingen, both of Netherlands

[73] Assignee: Lever Brothers Company, New York, N.Y.

[21] Appl. No.: 321,027

[22] Filed: Nov. 13, 1981

[30] Foreign Application Priority Data

Nov. 27, 1980 [GB] United Kingdom ............... 8038026

[51] Int. Cl.$^3$ .......................... A23D 3/02; A23D 5/02
[52] U.S. Cl. .................................. 426/602; 426/603; 426/613
[58] Field of Search ............... 426/602, 603, 604, 613

[56] References Cited

U.S. PATENT DOCUMENTS

| 2,024,647 | 12/1935 | Joyce | 426/603 |
| 2,054,072 | 9/1936 | Ellis | 426/603 X |
| 2,955,039 | 10/1960 | Melnick et al. | 426/603 |
| 3,268,341 | 8/1966 | Sjoholm et al. | 426/603 X |
| 4,325,980 | 4/1982 | Rek et al. | 426/604 |

*Primary Examiner*—Robert A. Yoncoskie

[57] ABSTRACT

A process for producing fat-continuous emulsions which are stable at relatively high ambient temperatures and which give on consumption an improved impression of water-soluble flavoring components, particularly salt or sugar.

The process involves adding said flavoring components in the form of a dispersion in a pourable or liquid fat into a partly crystallized water/oil emulsion.

16 Claims, No Drawings

PROCESS FOR PRODUCING A FAT-CONTINUOUS EMULSION SPREAD WITH IMPROVED PERCEIVED TASTE SENSATIONS OF WATER SOLUBLE FLAVORANTS

The present invention relates to a process for producing a fat-continuous emulsion, particularly a margarine, comprising a plastic fat blend having a relatively high solid fat content at relatively high ambient temperatures, and an aqueous phase which contains water-soluble favouring components.

Fat blends having a relatively high solid fat content at ambient temperatures ranging from 24°-45° C. are often used for producing non-refrigerated or tropical margarines. The emulsions have to be stable at said relatively high temperatures and consequently they will not easily break in the mouth and water-soluble components such as sodium chloride, flavours, sugar, etc. will not be sufficiently perceived by the consumer.

Many attempts have been made to improve the perception of water-soluble components on consumption of said emulsions without affecting the stability of the emulsions. These attempts have failed because of the difficulty of reconciling the requirements as to stability and perceived impression of water-soluble flavouring components.

Applicants have found a process which provides fat-continuous emulsions that are stable at relatively high temperatures and give an improved impression on the palate during comsumption.

The following description will be focussed on margarine-type products, particularly salt-containing non-refrigerated margarines. It is self-evident, however, that the process of the present invention can be applied for producing any type of w/o emulsions which have to meet the above requirements of stability at high ambient temperatures and satisfactory release on the palate of water-soluble components.

The process according to the invention for producing a water-in-oil emulsion which on consumption gives an improved perceived impression of water-soluble components comprises:

(a) emulsifying an aqueous phase in a fatty phase containing a plastic fat blend to obtain a w/o emulsion;

(b) subjecting the w/o emulsion thus obtained to working and cooling in order to at least partly crystallize the fat;

(c) incorporating in the partly crystallized w/o emulsion a water-soluble flavouring ingredient in the form of a dispersion in an oil which is pourable and preferably completely liquid at ambient temperature.

Fat blends with a high solid fat content at a temperature ranging from 25° to 45° C. which are useful for producing tropical margarines, have preferably the following characteristics:

$N_{10° C.} = 15-85$, preferably 40-85;
$N_{20°C.} = 10-50$, preferably 20-50;
$N_{30°C.} = 5-18$;
$N_{40°C.} = 0.1-8$;
$N_{45°C.} = 0-3$, wherein N stands for the solid fat content in weight percent at a given temperature (see the article of Van Putte and Van den Enden in J. Am. Oil Chemists' Soc., Vol. 51(1974), page 316). In such fat blends part of the fat components preferably consists of an oil hydrogenated to a melting point ranging from 35° to 70° C. or a high-melting stearin, e.g. a palm oil stearin obtained by fractionation of palm oil.

A suitable fat blend for the purpose of the invention may consist of 88% of coconut fat and 12% of a mixture consisting of (i) a vegetable oil such as maize oil, soya oil, sunflower oil, which has been hydrogenated to a melting point of about 65° C., and (ii) palm oil hydrogenated to a melting point of about 58° C. Another fat blend which is suitable for the purpose of the invention may consist of 61.5% of palm oil, 30% of palmkernel oil and 8.5% of hydrogenated palm oil (melting point 53° C.). Still another fat blend which is suitable for the purpose of the present invention may consist of 80% of palm oil, 10% of palm oil hydrogenated to a melting point of 47° C. and 10% of palmkernel fat.

Part of the palm oil or coconut oil may also be replaced by a liquid oil.

Working and cooling are preferably carried out in classical surface-scraped heat exchangers. For the purpose of the invention a so-called A-unit (a cooled surface-scraped apparatus), followed by a C-unit (an apparatus wherein the emulsion is kept homogeneous by working it with a system of rods) is used, but other apparatus such as a Combinator, Complector and the like can be used.

The fat which is to be worked in the A-unit is first heated to a temperature allowing melting of the fat. A temperature ranging from 45°-60° C. will be sufficiently high for most fat blends. The temperature conditions prevailing in the A-unit are preferably such that a rapid cooling takes place. In most instances a temperature of the cooling medium of $-50°$ to $-30°$ C. will be adequate.

In order to obtain emulsions having a good stability it is advantageous to ensure that the residence time in said A-unit is long enough to promote the formation of small droplets of the aqueous phase. In most cases a residence time preferably ranging from 0.1 to 1 min. will be adequate.

The working conditions applied in the A- and C-units should preferably be such that an average droplet size not exceeding 10 microns and preferably an average droplet size ranging from 1-5 microns is achieved.

The process conditions applied in the C-unit ensure that droplets of the aqueous phase with an adequate size are produced which are surrounded by a shield of crystallized fat. This contributes to obtaining emulsions with a good stability at high ambient temperatures while avoiding diffusion of water-soluble components, particularly sodium chloride, dispersed in the pourable or liquid fat, into the aqueous phase and diffusion of water to the continuous phase. The residence time in the C-unit preferably ranges from 2 to 6 min.

In step (c) of the process according to the invention at least part of the water-soluble flavouring ingredients, particularly sodium chloride and/or saccharose of an average crystal size not exceeding $40\mu$ and preferably ranging from $1-20\mu$ dispersed in a pourable and preferably completely liquid oil is added to the partly crystallized mixture emerging from the C-unit. The pourable liquid oil preferably consists of a non-hydrogenated vegetable oil and is preferably one of the components of the fat blend. The proportion of oil to be used for that purpose is not critical but should be sufficient for obtaining a good dispersion. In most instances 20 to 75%, preferably 30-60% of the total amount of that part of the fat which is pourable or liquid at ambient temperature (15°-45° C.) will be adequate.

Applicants have found that it was advantageous for organoleptic reasons and in order to avoid too strong a diffusion of the water-soluble component from the fatty phase into the aqueous phase, to disperse 20-60%, preferably 30-50% of the total amount of water-soluble component, which for sodium chloride may vary from 1-5% and for saccharose from 1-6%, to be added to the partially crystallized w/o emulsion and to incorporate the remainder in the aqueous phase. The aqueous phase may contain an appropriate proportion of water-soluble components such as salts, sugars, thickening agents, proteins, etc.

After adding the dispersion of the water-soluble ingredient(s) in the liquid oil to the partly crystallized emulsion, the mixture is preferably subjected to a further cooling and working to obtain the final w/o emulsion having the appropriate texture and plasticity. This treatment is preferably carried out in a sequence of surface-scraped heat exchangers comprising a second cooled A-unit in which further crystallization takes place and a C-unit where post-crystallization is allowed to take place. The residence time in the second A-unit is very much shorter than that in the first A-unit. In most cases a residence time of 1 to 20 seconds will be adequate. The residence time in the second C-unit is preferably 1 to 3 minutes.

The invention will now be illustrated by the following Examples.

EXAMPLE 1

A tropical margarine having the following composition was produced:
79.8% of fat
0.6% of skim milk powder
3.0% of salt
0.1% of minor ingredients up to 100% of water.
The fat blend consisted of 88% of coconut fat; 8.4% of bean oil hardened to a melting point of 65° C.; and 3.6% of palm oil hardened to a melting point of 58° C.

A dispersion of salt crystals (average size about 10 microns) in coconut oil was produced by mixing one third of the total amount of salt in a proportion of coconut fat corresponding to about 40% of the total amount of coconut fat to be used.

The remaining proportion of the fat blend and the aqueous phase containing salt and protein were fed to a surface-scraped heat exchanger (A$_1$-unit), which surface was cooled to −20° C., where it was worked for about 0.3 minute.

Post-crystallization was allowed to take place in a C-unit. The emulsion energing from the C-unit had a dispersed aqueous phase (average droplet size 5 microns). The emulsion was mixed with the dispersion of salt in liquid oil and the mixture obtained was fed into a second A$_2$-unit where it remained for 10 seconds. Post-crystallization was then allowed to take place in a second C$_2$-unit.

The margarine obtained was subjected to a panel of experts.

The preceived salt impression of the product obtained according to the process of the present invention was found satisfactory. Moreover, the stability of the product produced according to the invention remained good after storage for one week at 40° C.

The stability of the product was also tested under severe conditions, involving cycling for 16 hours at 25° C., followed by 8 hours at 40° C. This treatment was repeated 4 times. The product was assessed by the panel of experts. No deterioration could be observed.

Comparative Example 1

The general procedure of Example 1 was repeated, except that all the salt was dissolved in the aqueous phase. This product was subjected to a panel of experts. The experts found that salt hardly perceivable.

Comparative Example 2

The general procedure of Example 1 was repeated, except that all the salt was added as such to the partly crystallized product emerging from the C-unit. The surface appearance of the product was unacceptable (coarse).

Comparative Example 3

The general procedure of Example 1 was repeated, except that all the salt was added in the form of an aqueous solution (brine) to the partly crystallized product emerging from the C-unit.

On storage the surface appearance of the product became gradually coarser. In metallic containers corrosion became apparent, due to the presence of water. The perceived salt impression was unsatisfactory.

Comparative Example 4

The general procedure of Example 1 was repeated, except that all the salt was mixed with the fat blend before proportioning the fatty phase and the aqueous phase in the A-unit.

Examination of the product revealed that the crystal structure was adversely affected and that diffusion of salt from the fat to the dispersed phase occurred on storage.

EXAMPLE 2

Example 1 was repeated, except that a fat blend was used consisting of 61.5% of palm oil, 8.5% of palm oil hydrogenated to a m.p. of 53° C. and 30% of palmkernel oil.

1.5 wt.% salt (based on the total composition) was dispersed in 36.63% of the total fat. This fat consisted of 66.7% of palmkernel oil and 33.3% of palm oil.

The stability of the product and the oral response were comparable to those of the product of Example 1.

EXAMPLE 3

A sweet spread was produced, having the following composition:
80% of fat
0.3% of monoglyceride
0.2% of beta-carotene
4% of saccharose
0.6% of skimmilk powder
2% of sodium chloride
water up to 100%.
The fat blend consisted of 90% of coconut oil, 7% of soybean oil hydrogenated to a melting point of 69° C. and 3% of a palm oil hydrogenated to a melting point of 58° C.

One third of the total amount of saccharose (average crystal size about 10 microns) was dispersed in 40% of the total amount of coconut oil. The remaining portion of the fat blend and the aqueous phase containing the remainder of the saccharose, the protein and sodium chloride were further processed following the procedure of Example 1. The spread obtained was subjected to a panel of experts.

The perceived sweet impression of the product obtained according to the process of the present invention was found satisfactory. Moreover, the stability of the product produced according to the invention remained good after storage for one week at 40° C.

The stability of the product was also tested under severe conditions, involving cycling for 16 hours at 25° C., followed by 8 hours at 40° C. This treatment was repeated 4 times. The product was assessed by the panel of experts. No deterioration could be observed.

We claim:

1. A process for producing an edible water-in-oil emulsion spread which on consumption gives an improved perceived impression of water soluble flavorants, comprising (a) emulsifying an aqueous phase in at least a partially melted fatty phase containing a plastic fat blend to obtain a W/O emulsion; (b) subjecting the W/O emulsion thus obtained to working and cooling to at least partly crystallize the fat; (c) incorporating in the partly crystallized W/O emulsion a water-soluble flavouring ingredient in the form of a dispersion in an oil which is pourable or liquid at ambient temperature, and further cooling and working to obtain a spread.

2. A process according to claim 1, in which the plastic blend has the following solids content:
$N_{10°C.}=15-85$; $N_{20°C.}=10-50$; $N_{30°C.}=5-18$; $N_{40°C.}=0.1-8$; $N_{45°C.}=0-3$.

3. A process according to claim 1, in which the plastic blend has the following solids content:
$N_{10°C.}=40-85$; $N_{20°C.}=20-50$; $N_{30°C.}=5-18$; $N_{40°C.}=0.1-8$; $N_{45°C.}=0-3$.

4. A process according to claim 1, in which at least part of the fat blend consists of an oil hydrogenated to a melting point ranging from 35° C. to 70° C.

5. A process according to claim 1, in which the water-soluble flavouring ingredient is dispersed in 20–75% of that part of the fat blend which is liquid at ambient temperature.

6. A process according to claim 5, in which the water-soluble flavouring ingredient is dispersed in 30–60% of that part of the fat which is liquid at ambient temperature.

7. A process according to claim 1, in which 20–60% of the water-soluble flavouring ingredient is incorporated in the partly crystallized W/O emulsion as a dispersion in the oil and the remainder is incorporated in the aqueous phase.

8. A process according to claim 7, in which 30–50% of the water-soluble flavouring ingredient is dispersed in the partially crystallized emulsion and the remainder is incorporated in the aqueous phase.

9. A process according to claim 1, in which the working and cooling conditions applied are such that the average droplet size of the dispersed aqueous phase does not exceed 10 microns.

10. A process according to claim 9, in which the working and cooling conditions applied are such that the average droplet size of the dispersed aqueous phase ranges from 1–5 microns.

11. A process according to claim 1, in which the water-soluble flavouring ingredient dispersed in the pourable or liquid oil has an average particle size not exceeding 40 microns.

12. A process according to claim 11, in which the average particle size of the water-soluble flavouring ingredient ranges from 1–20 microns.

13. A process according to claim 1, in which the water-soluble flavouring ingredient is sodium chloride.

14. A process according to claim 13, in which 1–5 wt.% of sodium chloride is used.

15. A process according to claim 1, in which the water-soluble flavouring ingredient is a sugar.

16. A process according to claim 15, in which 1–6 wt.% sugar is used.

* * * * *